June 9, 1931.　　　　G. E. GRIMM　　　　1,809,589
COWL VENTILATOR
Filed May 31, 1927
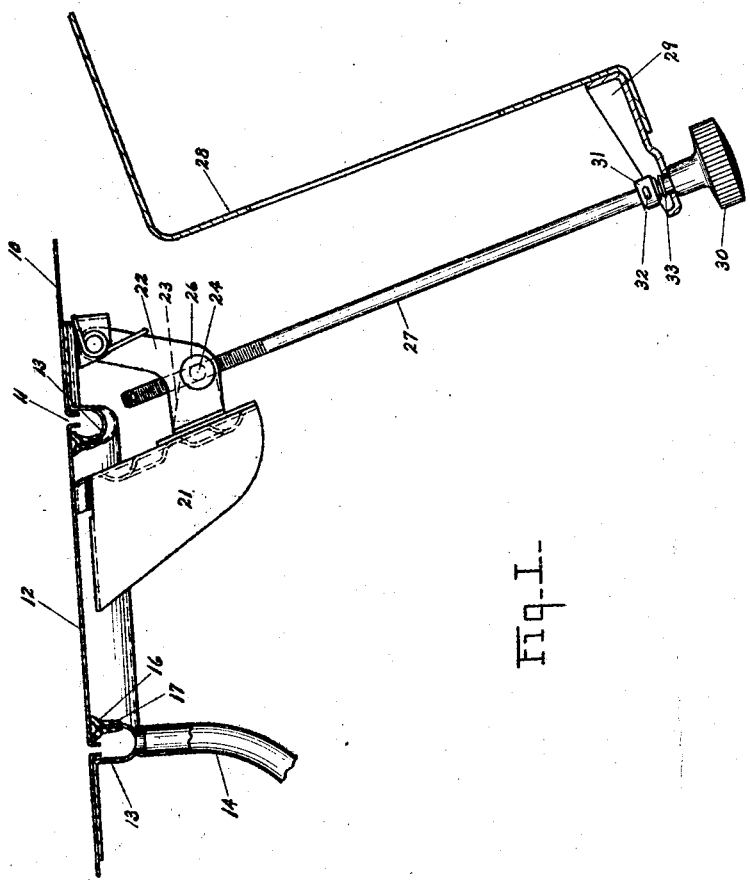
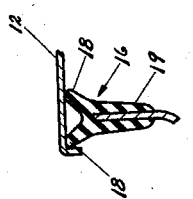
INVENTOR.
GEORGE E. GRIMM
BY Chester H. Broselton
ATTORNEY.

Patented June 9, 1931

1,809,589

UNITED STATES PATENT OFFICE

GEORGE E. GRIMM, OF TOLEDO, OHIO, ASSIGNOR TO THE WILLYS-OVERLAND COMPANY, OF TOLEDO, OHIO, A CORPORATION OF OHIO

COWL VENTILATOR

Application filed May 31, 1927. Serial No. 195,243.

My invention relates to a novel construction for ventilators such as are commonly formed in the cowl of passenger vehicles, and it embraces a weather strip or gasket member particularly adapted to be employed in conjunction with such ventilators.

One object of my invention is to provide a ventilator construction in which the operating arm is readily accessible, although not exposed to the vision of the occupants.

Another object of the invention is to provide a flexible weather strip which is readily applied and which maintains a uniform balanced position.

A further object of this invention is to provide a weather strip or gasket that affords a better seal between two relatively movable members, and which is not easily disengaged from its operative position.

As an additional object, the invention contemplates a weather strip or gasket member which is easily applied and which maintains its position without supplemental mechanical securing means.

It is common practice to employ a flexible member usually of a rubber composition, for the purpose of establishing a seal between two relatively movable members, such for example as a ventilator in the cowl portion of an automobile. To this end a rubber strip is secured to one of the members which is engaged by the other member to form an air tight seal. Heretofore such a strip was constructed to include a flat band having a grooved or rabbeted portion which may be fitted about the edge of one of the movable members. It has been observed, however, that frequent engagement and disengagement causes the rubber member to bend over to one side or to the other and gradually work itself free from the member to which it was initially secured.

According to the present invention, I have provided a construction in which the gasket element is balanced and thereby maintains its normal aligned position. The invention likewise provides an operative mechanism for the ventilator cover which is hidden from the vision, yet is readily accessible and easily operable. A better understanding of its principles may be had by referring to the drawings wherein Figure I is an elevational view partly in section, illustrating the relation of the mechanical elements constituting the ventilator cover and the instrument board, and Fig. II is a detail view on a somewhat enlarged scale, of one embodiment of the improved weather strip or gasket.

In the drawings the numeral 10 indicates the cowl portion of the automobile which is of a metallic sheet of a suitable gauge. An opening 11 is provided therein for a ventilator cover 12 which may be raised or lowered to suit the requirements of the occupants of the car. Adjoining the edge of the opening in the cowl portion is a trough 13 of U-shaped contour having a flanged extension which is rigidly secured to the cowl. The trough serves as a drain for water that accumulates on the adjoining surfaces. A tubular extension 14 to the lower portion of the car affords a suitable exit for any water that accumulates within the drain trough. As is to be observed, the cover rests upon the inner edge of the U-shaped drain and overlaps the same a short distance. A weather strip 16 is interposed between the inner edge of the drain and the lower surface of the cover. This strip is of a Y-shaped cross section in which a groove or rabbet is formed in the lower arm to receive the edge as indicated at 17. Its two upper arms or lips 18 are symmetrically disposed with respect to the base portion 19 and engage the cover 12 along individual lines of contact, thereby forming a double seal. When the cover is lowered into engagement with the lips they are bent in opposite directions thereby balancing the forces which in the conventional construction eventually result in disengaging the strip free of the rabbeted portion.

It will be noted that the symmetrically disposed lips not only equalize the forces but tend to pinch or crimp the edge of the channel between the rabbeted base portions, thereby insuring a more secure union.

The cover is actuated by means of a train of elements including a bracket 21 which is rigidly secured to the lower surface of the cover, and to which, in turn, there is rigidly secured a plurality of L-shaped links 22 that are pivoted to the cowl 10. An auxiliary bracket 23 is likewise rigidly secured to the cover bracket which supports one end of a pivotal pin 24, the other end of which is supported in one of the L-shaped links. A collar 26 is secured to the pin and is provided with a threaded hole that extends diametrically therethrough to accommodate the threaded end of an actuating rod 27. Adjacent the rod and substantially parallel thereto is located an instrument board 28 which may be rigidly secured to the body portion of the automobile in any approved manner. The lower end of the actuating rod 27 extends through a rearwardly projecting bracket 29 formed integrally with the instrument board, and is provided with a handle 30 for actuating the same. A collar 31 is fixed securely to the lower end of the rod by suitable means, such as a cotter pin 32, against which one end of a coil spring 33 is abutted. The other end of the spring rests upon the bracket 29. It will be observed that by rotating the actuating rod in an appropriate direction the cover 12 is raised or lowered as may be required.

From a consideration of the drawings and description specifically related thereto, it will be observed that the present invention provides a ventilator actuating mechanism in which the vibrations normally imparted to the cover are absorbed by the spring member 33. Furthermore, the actuating mechanism is hidden from the observation of the driver and is readily accessible for manipulation. It will also be observed that the weather strip or gasket affords an improved seal between the cowl and the ventilator cover; that in applying a strip of the disclosed construction a simple application of shellac or other binding material is sufficient and that mechanical means of securing the strip to the edge of the drain channel is not required; that the forces which normally tend to disengage the strip are equalized and thereby rendered ineffective and that the application of the strip requires neither additional equipment nor revision of design.

Although there is illustrated but a single embodiment of my invention, it will be apparent that the principles underlying the same are not limited thereto, but are susceptible to many modifications without departing from the scope thereof, wherefore I desire that it be limited only as indicated by the prior art and the appended claims.

I claim:

1. A gasket for sealing a joint between two adjacent sheet metal members arranged at right angles to each other, comprising a body portion having a slot adapted to engage opposite sides of one member, and a pair of identical extensions forming a V adapted to engage the other member.

2. A gasket for sealing two adjacent sheet metal members arranged at right angles to each other, comprising a body portion having a slot adapted to engage opposite sides of one member and a pair of upwardly and outwardly extending identical projections, adapted to engage the other member, said upwardly and outwardly extending projections being flexible and symmetrical with respect to the slot.

In testimony whereof, I affix my signature.

GEORGE E. GRIMM.